April 28, 1936.　　　　　R. CLADE　　　　　2,038,886
LUBRICATED VALVE
Filed Jan. 31, 1933
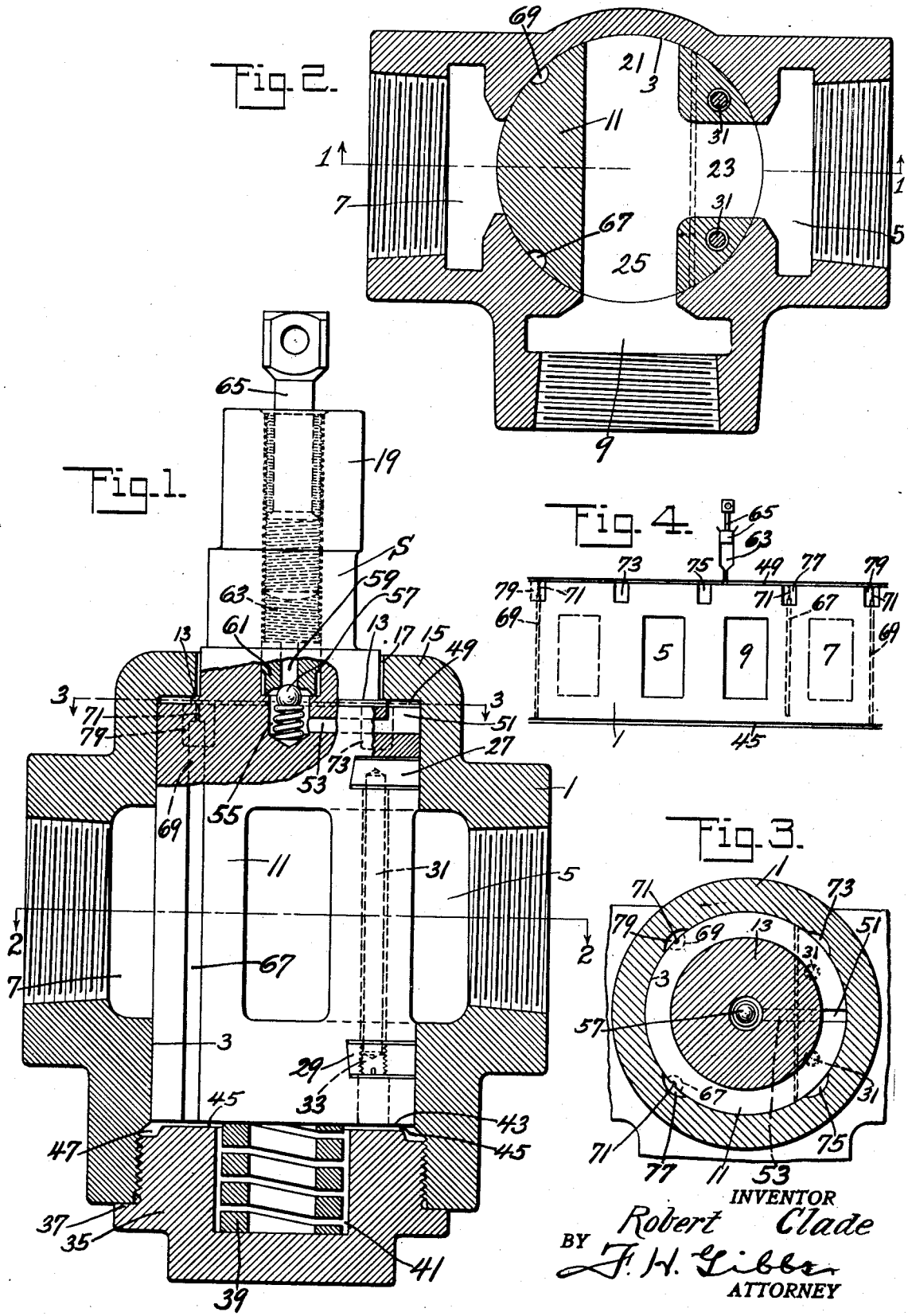
INVENTOR
Robert Clade
BY F. H. Gibbs
ATTORNEY Patented Apr. 28, 1936

2,038,886

UNITED STATES PATENT OFFICE 2,038,886

LUBRICATED VALVE

Robert Clade, Detroit, Mich., assignor to American Car and Foundry Company, New York, N. Y., a corporation of New Jersey Application January 31, 1933, Serial No. 654,406

12 Claims. (Cl. 251—93)

This invention relates generally to valves of the type in which lubricant is forced under pressure between the valve plug and valve body to seal the valve against leakage.

One object of the present invention is the provision of a new and improved lubricated valve.

Another object of the invention is the provision of a new and improved three-way lubricated valve in which lubricant under pressure is forced through the stem of a valve plug into a lubricant chamber within the body from where it passes to contacting surfaces of a valve plug and valve body to lubricate the valve.

Still another object of this invention is the provision of a valve having means for lubricating the contacting surfaces of the valve plug and valve body, the valve plug and valve body being relatively so arranged that when the valve has been sufficiently lubricated a visual signal is provided for advising an operator to this effect.

A further object of this invention is the provision of a valve including a valve body having a plug axially movable and rotatably mounted within the body, the valve plug being normally maintained in metal-to-metal contact with the valve body for sealing the body against leakage.

A further object of this invention is the provision of a new and improved valve plug for lubricated valve constructions.

A still further object of this invention is the provision of a lubricated valve having a new and improved lubricant groove or duct system for the passage of lubricant to the various relative working parts of the valve.

Other objects and advantages of this invention will be apparent from the following description taken in conjunction with the accompanying drawing in which:

Figure 1 is a sectional view through the valve of the present invention, the view being taken substantially on the line 1—1, Fig. 2, and showing the valve plug for the greater part in side elevation, a portion of the plug being shown in section to disclose the lubricant feeding means more clearly.

Fig. 2 is a sectional view on the line 2—2, Fig. 1.

Fig. 3 is a sectional view on the line 3—3, Fig. 1, and

Fig. 4 is a diagrammatic showing of the grease groove and port arrangement of the valve shown in the remainder of the figures of the drawing.

Referring now more particularly to the drawing, the valve of the present invention comprises a body indicated generally at 1 having a central longitudinal bore providing a valve plug seat 3, and said body is provided with a plurality of port openings indicated at 5, 7 and 9, either of which may be used as an ingress port for fluid and either of which may be used as an egress port, as will be obvious.

Arranged within the valve body 1 is a valve plug 11 which, in the instance shown, is of the cylindrical type and is rotatably fitted to the seat 3 in the valve body. The upper end portion of the plug is reduced in diameter to provide a shoulder 13 which contacts with the lower surface of a head portion 15 formed, in the instance shown, integral with the valve body 1 and having an aperture therein through which the stem S of the plug extends. As clearly shown in Fig. 1, the stem S just above the shoulder 13 is spaced from the wall of the opening in head 15 to provide a lubricant escape passage 17 which is more clearly described hereinafter. The upper end portion 19 of the stem S is formed to receive a suitable tool such as a wrench or the like for rotating the plug 11 within the body 1. The plug 11 is provided with a plurality of connected ports 21, 23 and 25 respectively adapted to register with the body ports 5, 7 and 9 upon appropriate rotation of the plug 11. In the instance shown in Figs. 1 and 2, the body ports 5 and 9 are connected respectively with the plug ports 23 and 25 so that fluid may flow through the valve either through ports 9, 25, 23 and 5 or vice versa.

Due to inequalities in machining the contacting surfaces of the plug and valve body the fit of the plug 11 against seat 3 may present a certain though slight looseness which, when the valve plug is in certain positions within the valve body 1, may cause radial shifting of the plug within the body as the result of line pressure directed against the plug. This is undesirable in three-way valves and to prevent this above and below the plug port 23 are positioned adjustable inserts 27 and 29 respectively which are adapted to be moved into close fitting engagement with the plug seat 3 by means of compression rods 31 adapted to be actuated by set screws 33; this construction being similar to that shown in my co-pending application, Serial No. 654,405, filed January 31, 1933.

The lower end portion of the body 1 is open and is interiorly threaded to support a base plate 35 which closes said open end and which is provided with a shoulder 37 adapted to contact with the lower end of said body to limit the inward movement of said base plate. The plug 11 is normally urged upwardly within the body 1 whereby the shoulder 13 is maintained in contact with the lower surface of the head 15 by spring means 39 arranged in a spring pocket 41 and acting against the lower end 43 of the plug 11, the arrangement being such as to provide a lower lubricant chamber 45 between the lower end portion of the plug 11 and the upper portion of the base plate 35, this grease chamber obviously being in communication with the spring pocket 41. The upper end portion of the base plate 35 is reduced in diameter to provide a lower annular grease groove 47 below the valve plug 11. Due to the contact of shoulder 13 with the head portion 15 it is obvious that an upper lubricant chamber 49 is provided around the stem S, this lubricant chamber being defined between the head portion 15 and the upper end portion of plug 11 and receiving lubricant, such as grease, under pressure from connecting groove 51 formed in the upper end portion of the plug at its side and receiving grease under pressure through a grease port 53 arranged transverse to the longitudinal axis of the plug and in communication at one end with the connecting groove 51 and at its opposite end with a check valve chamber 55 formed in the upper end portion of the plug 11 and containing a spring-pressed ball check valve 57 which normally closes an opening 59 formed in tubular valve seat member 61 secured in the lower end portion of a lubricant reservoir 63 formed longitudinally in the stem S. The chamber 63 receives an adjustable ram 65 adapted to force grease or other suitable lubricant through the valve seat member 61 past the check valve 57 into chamber 55 for feeding grease to the upper lubricant chamber 49.

For lubricating the contacting surfaces of the plug and seat 3 the plug 11 is provided with longitudinally extending grease grooves indicated at 67 and 69 respectively and said grooves are arranged opposite the plug port 23, as clearly shown in Fig. 2. In other words, the grooves 67 and 69 are so arranged as to supply grease between the plug and valve body at points opposite the plug port 23 regardless of the position of the plug 11 within the body. As clearly shown in Figs. 1 and 4, the ends of grease groove 67 terminate between the upper and lower lubricant chambers 49 and 45 respectively, while the groove 69 extends through the lower end portion of the plug 11 to communicate with the lower grease chamber 45 and has its upper end terminating below the upper grease chamber 49. Formed in plug 11 and leading from the upper ends of grooves 67 and 69 are scratch grooves 71 of smaller diameter than grooves 67 and 69, said scratch grooves extending to the upper end of the plug so that the upper lubricant chamber is in constant communication with said grooves 67 and 69. In effect, the grooves 67 and 69 have their upper end portions restricted.

For establishing direct communication from the lubricant chamber 49 for free flow of lubricant to the grooves 67 and 69, the valve body 1 in the interior thereof just below the head portion is provided with a plurality of short or dwarf grease grooves indicated in the drawing (see Figs. 3 and 4) as 73, 75, 77 and 79 respectively, the upper ends of which lead into the upper lubricant chamber 49, as shown in Fig. 1 and as diagrammatically shown in Fig. 4. In actual practice these grooves are really portions cut out of the interior of the body 1 adjacent the head portion, the grooves 73, 75, 77 and 79 being formed in the valve seat 3 and being of a length sufficient to overlap the plug grooves 67 and 69 so that when either pair of the body grooves overlap adjacent plug grooves it is apparent that lubricant under pressure will pass freely from the upper lubricant chamber 49 into the body grooves and then into the plug grooves, and then to the lower lubricant chamber 45 through one of the plug grooves. An example of this is illustrated in Fig. 4 where the plug grooves 67 and 69 are overlapped by the body grooves 77 and 79. In this instance lubricant under pressure will freely flow from the lubricant chamber 49 into the body grooves 67 and 69 through body grooves 77 and 79 respectively down opposite sides of the body port 7. Due to the connection of groove 69 with the lower grease chamber 45 grease is conducted below the plug and into the lower grease chamber as will be apparent. From the description above it will also be obvious that when the valve plug is so arranged within the body 1 that neither of the plug grooves 67 and 69 is in communication with either of the body grooves 73, 75, 77 or 79, the grease in upper lubricant chamber 49 is not trapped therein but may pass through restricted portions or scratch grooves 71 into the plug grooves 67 and 69 and from the latter into the lower grease chamber 45, thus grease is under pressure at all times to all contacting surfaces of the plug and body regardless of the position of the plug in the body.

Since greases or lubricants are semi-solid and have high viscosity, they do not conform to the law of the transmission of pressures of liquids. Therefore, when pressure is built up in chamber 49 by the injection of a lubricant, the pressure in the space between the lower end of the valve plug and the bottom closure 35, indicated at 45 in the drawing, will not be raised to the same amount but will be appreciably less. In tests conducted with a valve such as shown and described, it has been found that during the injection of a standard valve grease into the valve the pressure per square inch built up in chamber 45 is approximately 30% of the pressure in the upper chamber 49. The drawing discloses the area of the lower end of the plug as being greater than the area of the upper end of the plug, but, since during the lubrication process the pressure built up per square inch of the plug head exposed to lubricant under pressure in the upper chamber 49 greatly exceeds the pressure per square inch in the space or chamber 45, it is obvious that when a predetermined pressure is reached in chamber 49 the total pressure applied to the top of the plug will exceed that applied to the bottom by the lubricant and the spring 39, and the plug is shifted axially in the valve body thereby permitting grease to leak out of the chamber 49 past the stem of the plug.

In the design of a valve, it will be apparent that by properly correlating the areas of the top and bottom of the plug which are exposed to lubricant pressure, and by utilizing a spring 39 of selected and predetermined capacity, provision is made for causing the lubricant to leak out of the valve body when a predetermined pressure has been reached in the upper lubricant chamber 49. This obviously provides for protecting the valve against the building up of bursting pressures within the valve body.

Due to the specific mounting of the plug 11 within the body it is apparent that when the valve is being lubricated and grease under pressure forced into chamber 49 and then down the plug grooves to the lower grease chamber 45, it is impossible to over-lubricate the valve or, to be more exact, to inject grease within the body to an amount which renders the plug difficult to rotate because pressure will be built up within the upper lubricant chamber 49 to an amount sufficient to overcome the action of spring 39 and the pressure of lubricant in lower chamber 45 and thus force the plug 11 axially downward in the body 1 and such movement will unseat shoulder 13 from the head portion 15 to permit escape of excess lubricant through the passage 17 which surrounds the valve plug stem S and such escape of lubricant furnishes a visual signal indicating that the valve has been sufficiently lubricated. This particular arrangement furnishes a safety feature which not only prevents over-lubrication of the valve to an extent sufficient to render the valve plug substantially incapable of rotation but also prevents the building up of a pressure within the valve body which is sufficient to burst the latter. When the pressure within the body has been reduced below that of the normal spring action plus the pressure of the lubricant in lower chamber 45 it is obvious that the plug 11 will shift axially upward in body 1 and its shoulder 13 again assume a metal-to-metal sealing contact with head portion 15.

It is believed that the description and drawing herein are sufficient to enable anyone skilled in the art to fully understand the present invention. It is to be understood, however, that the drawing is for illustrative purposes only and illustrates one form of the present invention. Obviously various changes in the form and proportions of the construction may be made within the scope of the appended claims without departing from the spirit of the invention.

What is claimed is:

1. In a lubricated valve, a body having a longitudinal bore providing an internal plug seat, an integral head portion for said body, a valve plug fitting the plug seat and provided with a reduced upper end portion constituting a shoulder adapted to contact with the head portion in sealing relation, a lubricant chamber in the body defined between the head portion and plug, spring means normally retaining the shoulder and head portion in sealing engagement, a stem extending from the plug through the head portion and having a lubricant reservoir therein, and means including a duct for forcing lubricant under pressure from the reservoir to the lubricant chamber.

2. In a lubricated valve, a body having a longitudinal bore providing an internal plug seat, an integral head portion for said body, a valve plug fitting the plug seat and provided with a reduced upper end portion constituting a shoulder adapted to contact with the head portion in sealing relation, a lubricant chamber in the body defined between the head portion and plug, a stem extending from the plug through the head portion and having a lubricant reservoir therein, means including a duct in the plug communicating with the reservoir and lubricant chamber for forcing lubricant under pressure into said chamber, and means normally maintaining the shoulder in sealing engagement with the head portion so formed and arranged as to yield in response to pressure in the lubricant chamber sufficient to cause axial movement of the plug in the body whereby excess lubricant may escape from the lubricant chamber through the head portion.

3. In a lubricated valve, a valve body having an internal plug seat and a head portion, a plug in said body, adjustable means carried by the plug for retaining the latter against radial movement in the body, an annular shoulder formed at the upper end portion of the plug and adapted to engage the head portion in sealing relation, a lubricant chamber in the body surrounding said shoulder, a valve plug stem having a lubricant reservoir therein, a lubricant duct in the plug communicating with the reservoir, a connecting groove formed in the plug establishing communication between the lubricant chamber and said duct, spring means normally holding said shoulder and head portion in sealing engagement, lubricant grooves formed in the plug, dwarf grooves in the body at the lubricant chamber adapted to overlap the grooves in the plug, and means for forcing lubricant under pressure from the reservoir to the lubricant chamber.

4. In a lubricated valve, a body having an integral apertured head portion, an upper lubricant chamber in the head portion, said body having a longitudinal bore providing a plug seat, a plug fitting the seat and provided with a shoulder at its upper end portion in engagement with the head portion, a stem for the plug having a lubricant reservoir, a lubricant duct in the plug leading from the reservoir, a groove formed in the side of the plug at its upper portion and establishing communication between said duct and said lubricant chamber, lubricant grooves in the plug in communication at all times with the lubricant chamber, a lower lubricant chamber in the body in communication with at least one of the grooves in said plug, and spring means for maintaining the shoulder in sealing contact with the head portion.

5. In a lubricated valve, a plug, a valve body having a head portion and an internal seat for said plug, a shoulder at the upper end portion of the plug engaging the head portion in sealing relation, a lubricant chamber defined between overlapping portions of the plug and head portion, a stem for the plug projecting through the head portion and having a lubricant reservoir therein, lubricant ducts in the plug in communication with said reservoir, a groove formed in the side of the plug at its upper end portion establishing communication between said duct and lubricant chamber, spring means normally maintaining contact of the shoulder and head portion, longitudinal lubricant grooves in the plug having constant but restricted communication with the lubricant chamber, dwarf grooves in the body in communication with the lubricant chamber and adapted to overlappingly cooperate with the longitudinal grooves in the plug to provide for unrestricted passage of lubricant from the lubricant chamber to the grooves in said plug, and means in the reservoir for forcing lubricant under pressure into the lubricant chamber.

6. A valve plug comprising a body portion having ingress and egress port openings, and lubricant grooves formed in the body portion, certain of said grooves extending to the lower end portion of the plug and others having their lower ends terminating above the lower end of the plug, the upper end portions of each of said grooves being restricted in diameter and extending to the upper end of said plug.

7. A valve plug comprising a cylindrical body having ingress and egress port openings and a reduced upper end portion providing an annular shoulder, a pair of lubricant grooves formed in the body and having their upper end portions reduced in diameter and extended to the upper end of said body, one of said grooves extending the full length of said body and the other of said grooves having its lower end terminating short of the lower end of said body.

8. In a lubricated valve, a plug, a valve body having an internal seat for the plug and provided with a head portion, a shoulder formed on the upper end portion of the plug engaging the head portion in sealing relation, an upper lubricant chamber surrounding said shoulder and defined in part by overlapping portions of the plug and head portion, a base plate removably secured to the body and provided with a spring seat, spring means in said seat acting against the plug to maintain the shoulder in contact with said head portion and to retain the lower end portion of the plug in spaced relation to the base plate to provide therebetween a lower lubricant chamber, means carried by the plug and adjustable relative thereto into engagement with the plug seat for restraining the plug against radial shifting in the body, said means being so arranged as to retain diametrically opposite portions of the plug in sealing relation with the plug seat, cooperating grooves in the plug and body in communication with the upper lubricant chamber, a valve stem having a lubricant reservoir in communication with the upper lubricant chamber, and means including a check valve and a ram for forcing lubricant under pressure to the upper lubricant chamber to cause axial movement of the plug when the pressure within the body exceeds the spring action to effect separation of the shoulder from the head portion and escape of excess lubricant from the body.

9. A plug for a lubricated valve comprising a cylindrical body having ingress and egress port openings and a reduced upper end portion providing an annular shoulder, a stem for the plug having a lubricant reservoir formed therein, a pair of lubricant grooves formed in the body of the plug and having their upper end portions reduced in diameter and extended to the upper end of said body, one of said grooves extending the full length of said body and the other of said grooves having its lower end terminating short of the lower end of said body.

10. In a lubricated valve, a body having a longitudinal bore providing an internal plug seat, a head portion for the body, a valve plug fitting the plug seat, a lubricant chamber defined between overlapping portions of the plug and head portion, means including a duct in the plug communicating with the lubricant chamber for forcing lubricant under pressure into said chamber, and means normally maintaining the upper end portion of the plug in metal to metal sealing engagement with said head portion so formed and arranged as to yield in response to pressure in the lubricant chamber sufficient to cause axial movement of the plug in the body, whereby excess lubricant may escape from the lubricant chamber.

11. In a lubricated valve, a body having a longitudinal bore providing an internal plug seat, a head portion for the body, a valve plug fitting the plug seat and having a stem extending through the head portion, a lubricant chamber defined between overlapping portions of the plug and head portion, means including a duct in the upper end portion of the plug communicating with the lubricant chamber for forcing lubricant under pressure into said chamber, and means acting against the lower end of the plug for normally maintaining the upper end portion of the plug in metal to metal sealing engagement with the head portion, said means being so formed and arranged as to yield in response to pressure in the lubricant chamber sufficient to cause axial movement of the plug in the body to permit escape of excess lubricant from the lubricant chamber around the stem.

12. In a lubricated valve, a body having a longitudinal bore providing an internal plug seat, a head portion for the body, a valve plug rotatably fitting the plug seat, a lubricant chamber defined between overlapping portions of the plug and head portion, spring means acting against the lower end of the plug and normally maintaining the upper end portion of the plug in metal to metal sealing engagement with said head portion, and means including a duct in the upper end portion of the plug communicating with the lubricant chamber for injecting lubricant under pressure directly into said lubricant chamber, said spring means being so formed and arranged as to yield in response to pressure in the lubricant chamber in excess of the spring action whereby to permit axial movement of the plug in the body to separate the plug from the head portion and permit escape of excess lubricant from the valve body.

ROBERT CLADE.